(12) United States Patent
Kato

(10) Patent No.: US 6,698,891 B2
(45) Date of Patent: Mar. 2, 2004

(54) POLARIZING UNIT, POLARIZING ILLUMINATION DEVICE USING SAME POLARIZING UNIT AND PROJECTION DISPLAY DEVICE USING SAME POLARIZING ILLUMINATION DEVICE

(75) Inventor: Atsushi Kato, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 15 days.

(21) Appl. No.: 10/285,431

(22) Filed: Nov. 1, 2002

(65) Prior Publication Data

US 2003/0086066 A1 May 8, 2003

(30) Foreign Application Priority Data

Nov. 2, 2001 (JP) .......................................... 2001-337827
Jul. 16, 2002 (JP) .......................................... 2002-207553

(51) Int. Cl.[7] ............................................... G03B 21/14
(52) U.S. Cl. ......................................................... 353/20
(58) Field of Search ................................ 353/20, 84, 97, 353/98, 122; 359/495, 497

(56) References Cited

U.S. PATENT DOCUMENTS 5,884,991 A * 3/1999 Levis et al. ................... 353/122
6,005,722 A * 12/1999 Butterworth et al. ......... 359/712
6,053,615 A * 4/2000 Peterson et al. ............... 353/20
6,587,269 B2 * 7/2003 Li ................................. 359/497
2003/0007130 A1 * 1/2003 Maximus ....................... 353/20
2003/0007245 A1 * 1/2003 Edlinger et al. ............. 359/487

FOREIGN PATENT DOCUMENTS

JP   2000-131647 A   5/2000
JP   2000-206464 A   7/2000

* cited by examiner

Primary Examiner—William Dowling
(74) Attorney, Agent, or Firm—Sughrue Mion, PLLC

(57) ABSTRACT

A small polarizing illumination device is provided which can apply light effectively to a small-sized liquid crystal display device at a reduced diverging angle. The above device has a light source lamp, a reflecting mirror, a reflecting device with an opening, a square-wave plate, a rod integrator, a polarized light separating unit, and a condenser lens, in which the reflecting device with an opening, square-wave plate, rod integrator, and polarized light separating unit can be integrally arranged. The device can be made small. Since linearly polarized light component not transmitting through but being reflected off the polarized light separating unit transmits through the quarter-wave plate twice before again entering the polarized light separating unit after having been reflected off the above reflecting device or having transmitted through its opening portion and having been condensed again by the reflecting device and is converted and can contribute to illumination, thus improving efficiency of using the light source.

19 Claims, 8 Drawing Sheets

POLARIZING UNIT, POLARIZING ILLUMINATION DEVICE USING SAME POLARIZING UNIT AND PROJECTION DISPLAY DEVICE USING SAME POLARIZING ILLUMINATION DEVICE

BACKGROUND OF THE INVENTION

1. Field of the Invention

The present invention relates to a polarizing unit to achieve illuminating light made up of, for example, linearly polarized light, a polarizing illumination device using a same polarizing/unit and a projection display device using a same polarizing/illumination.

The present application claims priorities of Japanese Patent Application Nos. 2001-337827 filed on Nov. 2, 2001 and 2002-207553 filed on Jul. 16, 2002, which are hereby incorporated by reference.

2. Description of the Related Art

In recent years, a step toward miniaturization and high definition proceeds and improvements of an optical system making up a projection display device is made. In particular, as a method for improving brightness of a projected image and uniformity of illumination of a screen both being a requirement for performing functions of a display device, an optical system configured by combining an integrated optical system made up of fly's eye lens with a polarized light converting optical system made up of a polarized light beam splitter array has become commercially practical and therefore an optical system using three pieces of liquid crystal display devices being currently on the market has the configuration described above.

In the optical system having the above configuration, by dividing light fed from a light source into a plurality of pieces of partial light using an integrated optical system made up of two pieces of fly's eye lens to form a plurality of light source images and by comparing the light source image to a secondary light source, and by superimposing light on the liquid crystal display devices, illuminating light having same distributions of intensity of light can be effectively obtained.

Moreover, by using the polarized light converting optical system made up of polarized beam splitter arrays and integrated optical systems in combination, illuminating light is superimposed on a liquid crystal panel after having divided light into a plurality of pieces of partial light and having converted polarized light, that is, after same polarization directions have been provided and, therefore, efficiency of using a light source is comparatively high.

However, in such the projection liquid crystal display device having configurations as described above, in ordinary cases, since sizes of the fly's eye lens and the polarized beam splitter array become larger than those of an image display portion of the liquid crystal display device serving as a surface to be illuminated, a diverging angle of incident light into the liquid crystal display device becomes large. When the diverging angle of incident light becomes large and, therefore, when parallelism of incident light into the liquid crystal panel is reduced, light cannot be applied effectively to the liquid crystal panel and, as a result, efficiency of using light is lowered. Moreover, in order to improve an aperture ratio of the liquid crystal panel, the liquid crystal display device having a microlens array is also commercially available, however, it is known that, in the projection liquid crystal display device, unless light having high parallelism is incident on the microlens, efficiency of using light transmitting through a pixel opening portion is reduced.

Conventional optical systems aimed at reducing a diverging angle of light being incident on a liquid crystal display device are disclosed in Japanese Patent Application Laid-open Nos. 2000-131647 and 2001-206464 in which an illumination unifying unit using a columnar integrated device (mainly, rod integrator) and a polarized light converting unit are combined. In the conventional optical systems, as a polarized light separating unit, an optical system in which a plurality of polarized light beam splitter arrays each having a polarized light separating film formed on a junction face between a rectangular prism and a wedge-type prism or a plurality of polarized light beam splitters are arranged in an array form.

However, since a device to obtain uniformity of illumination and a device to convert polarized light are independently arranged in both the conventional optical systems described above, physical space to house them is required. Since a polarized light beam splitter made of glass used, in particular, in the conventional optical system provided as the disclosed former example becomes relatively large, the conventional optical system is not suitable in realizing a small-sized projection display device. Moreover, the conventional optical system has a disadvantage in a point of costs. Since two rod integrators, one to be used for p-polarized light and another to be used for s-polarized light, each being separated by polarization, are required, the conventional optical system is not suitable in a point of making it lightweight and costs low. In the optical system provided in the disclosed latter example, since a necessary number of the rod integrators is one and polarized light converting process is performed using the polarized light beam splitter array, it is advantageous in point of weight and costs when compared with the optical system provided in the disclosed former example. However, since the optical device to be used for uniformity of illumination and the optical device to be used for polarized light conversion are independently placed, space for arrangement has to be secured and it lacks in a point of making the illuminating device compact.

SUMMARY OF THE INVENTION

In view of the above, it is a first object of the present invention to provide a polarizing unit which is capable of making compact an optical system made up of a columnar integrated device (mainly, rod integrator) and a polarized light converting optical system and of reducing a diverging angle of light being incident on a comparatively smaller liquid crystal panel. It is a second object of the present invention to provide a new type polarizing illumination device which is made small and lightweight when compared with a conventional polarizing illumination device and is capable of reducing a diverging angle of light being incident on a comparatively small liquid crystal panel by using the above polarizing unit. It is a third object of the present invention to achieve miniaturization of a single plate display device of a time-sharing type made up of an LCOS (Liquid Crystal On Silicon) and a projection display device made up of a microlens, by utilizing the above new type polarizing illumination device.

According to a first aspect of the present invention, there is provided a polarizing unit for receiving light fed from a light source and for emitting polarized-illuminating light to an subject to be illuminated, the polarizing unit comprising:

a polarized light converter (polarized light converting means) used to obtain a specified type of polarized light and, when polarized light is incident from a side of the subject to be illuminated, to convert a phase difference between two light components whose polarized directions orthogonal to each other and to emit the polarized light to a side of the subject to be illuminated;

a light guiding member (light guiding means) having a light incident end face formed on a side of the light source and a light outgoing end face formed on a side of the subject to be illuminated and used to have incident light travel in a straight line or have internal reflection occur to guide the light;

a polarized light separator (polarized light separating means) to separate a specified type of polarized light from an other specified type of polarized light and to transmit the separated polarized light; and wherein the polarized light converter and the light guiding member are placed on a side of the light source in the polarized light separator.

With the above configuration, the polarized light converter, light guiding member, and polarized light separator can be formed in an integrated manner. As a result, the configuration contributes to miniaturization of the polarizing unit.

In the foregoing, a preferable mode is one wherein the polarized light converter has a reflector (reflecting means) with an opening which receives light emitted from the light source through an opening portion and reflects light being incident from a side of the subject to be illuminated and a phase delaying device (phase delaying means) being placed on a side of the subject to be illuminated of the reflector with the opening and wherein the reflector with the opening, the phase delaying device, the light guiding member are placed on a side of the light source of the polarized light separator.

With the above configuration, the reflector with the opening, phase delaying device, light guiding member, and polarized light separator can be arranged in an integrated manner. As a result, the configuration contributes to miniaturization of the polarizing unit.

Also, a preferable mode is one wherein the phase delaying device is placed between the reflector with the opening and the light guiding member.

With the above configuration, by configuring the reflector with the opening and the phase delaying device so as to come into contact with the light incident end face of the light guiding member, the reflector with the opening, phase delaying device, and the light incident end face of the light guiding member can be formed in an almost integrated manner and therefore the polarizing unit can be made compact.

Also, a preferable mode is one wherein the phase delaying device is placed between the light guiding member and the polarized light separator.

With the above configuration, by configuring the reflector with the opening so as to come into contact with the light incident end face of the light guiding member and by configuring the phase delaying device so as to come into contact with the light outgoing end face, the reflector with the opening, phase delaying device, and light guiding member can be formed in an almost integrated manner and therefore the polarizing unit can be made compact.

Also, a preferable mode is one wherein the light guiding member is made up of a solid or hollow columnar integrated device.

With the above configuration, the light being incident on the light incident end face is reflected totally to achieve uniformity of luminance and is guided to the light outgoing end face. Since internal reflection is used, superimposing illumination is performed on the light outgoing end face using luminous flux having less light convergence and therefore illumination having comparatively high parallelism can be made on a surface to be illuminated.

Also, a preferable mode is one wherein the reflector with the opening has the opening portion without a reflecting face being placed in its almost central portion and the opening portion allows light to be transmitted and other portions except the opening portion reflect light.

With the above configuration, randomly polarized light having transmitted through the opening portion of the reflector with the opening is incident on the polarized light separator through the phase delaying device and the light guiding member and another light component having been reflected off the polarized light separator travels backward to the light source and, after having passed through the light guiding member and the phase delaying device, is reflected off, for example, the reflector with the opening and is incident on the polarized light separator through the light guiding member and therefore light fed from the light source can be effectively used.

Also, a preferable mode is one wherein the phase delaying device is a quarter-wave plate.

With the above configuration, since the quarter-wave plate is used as the phase delaying device, another light component having been reflected off the polarized light separator travels backward to the light source and, after having transmitted through the light guiding member and the phase delaying device, is reflected off, for example, the reflector with the opening and is again incident on the polarized light separator through the phase delaying device and therefore is converted into linearly polarized light orthogonal to the previous polarized light direction which can transmit through the polarized light separator. As a result, light fed from the light source can be effectively used.

Also, a preferable mode is one wherein the columnar integrated device is made of glass or plastic and wherein the light incident end face and the light outgoing end face are of a rectangular square pole shape and wherein the columnar integrated device totally reflects light being incident on the light incident end face by a surrounding side face and to guide the light toward the light outgoing end face.

With the above configuration, the columnar integrated device made up of glass or plastic whose light incident end face and light outgoing end face are of a rectangular square pole shape totally reflects light being incident on the light incident end face by a surrounding side face to achieve uniformity of luminance and guides light to the light outgoing end face. Since internal reflection is used, superimposed illumination is made on the light outgoing end face using luminous flux having less light divergence, thus enabling illumination having a comparatively high parallelism on a surface to be illuminated.

Also, a preferable mode is one wherein the columnar integrated device is made of glass or plastic and wherein the light incident end face and the light outgoing end face are of a circular cylindrical shape and wherein the columnar integrated device totally reflects light being incident on the light incident end face by a surrounding side face and to guide the light toward the light outgoing end face.

With the above configuration, by using a circularly cylindrical integrated device as a light guiding member, the polarizing unit can be fabricated at lower costs compared with a case where the square pole shaped columnar integrated device is employed.

Also, a preferable mode is one wherein, on a side of the light outgoing end face of the columnar integrated device is placed a rectangular opening portion and the reflector with the opening using a surface on a side of the light source as a reflecting surface.

With the above configuration, since the reflector having the rectangular opening portion in a vicinity of the light outgoing end face of the columnar integrated device, for example, the liquid panel serving as an subject to be illuminated can be illuminated in a manner that a shape of an area being illuminated is rectangular and reduction of efficiency of illumination and of using the light source can be avoided.

Also, a preferable mode is one wherein a size of the polarized light separator is set to be larger than that of the rectangular opening portion.

With the above configuration, since a size of the polarized light separator is set to be larger than that of the rectangular opening portion of the reflector with the opening, light reaching the subject to be illuminated of the polarized light separator is all desired linearly polarized light that can be used to illuminate the subject to be illuminated.

Also, a preferable mode is one wherein the polarized light separator transmits only one component out of two linearly polarized components orthogonal to each other contained in randomly polarized light being incident and reflects another component out of the two linearly polarized components.

With the above configuration, it is made possible to apply linearly polarized light to the subject to be illuminated.

Also, a preferable mode is one wherein the reflector with the opening and the phase delaying device are configured so as to come into contact with the light incident end face of the light guiding member.

With the above configuration, by forming the reflector with the opening, phase delaying device, and light guiding member in an integrated manner, it is possible to make the polarizing unit be small-sized and lightweight.

Also, a preferable mode is one wherein the reflector with an opening is configured so as to come into contact with the light guiding member and the phase delaying device are configured so as to come into contact with the light outgoing end face.

With the above configuration, by forming the reflector with the opening, phase delaying device, and light guiding member in an integrated manner, it is made possible to make the polarizing unit be small-sized and lightweight.

Also, a preferable mode is one wherein the reflector with the opening is formed by vacuum evaporation on the light incident end face of the light guiding member.

With the above configuration, since the reflector with the opening is formed by vacuum evaporation on the light incident end face of the light guiding member, it is made possible to make the polarizing unit be compact.

According to a second aspect of the present invention, there is provided a polarizing illumination device for achieving uniformity of illumination and polarized light conversion by using the polarizing unit described above, including:

a light source;

a light condensing device to condense light fed from the light source;

the polarizing unit; and a condenser lens to gather light having passed through the polarized light separator on the subject to be illuminated.

With the above configuration, randomly polarized light having been gathered by the light condensing device and having transmitted through the opening portion of the reflecting device with the opening enters the polarized light separator through the phase delaying device and the light guiding member. One light component out of two linearly polarized light components whose polarizing axes orthogonal to each other transmits the polarized light separator and is used to illuminate the subject to be illuminated through the condenser lens. Another light component having been reflected by the polarized light separator travels backward to the light source and reaches the reflector with the opening through the light guiding member and the phase delaying device. In one case, the light having reached the reflector is reflected off the reflector with the opening. In another case, the light having reached the reflector transmits through the reflector with an opening and is again gathered by the light condensing device and then transmits through the reflector with the opening. In any case, the above light transmits through the phase delaying device twice before the light again reaches the polarized light separator through the light guiding member. Since the light has been converted into linearly polarized light intersecting the previous polarizing direction at right angles, the light can transmit through the polarized light separator. Therefore, the light can be used as illuminating light. Since an image showing uniform illuminating information on the light outgoing end face of the light guiding member is formed by the condenser lens, uniform illumination is made possible. Thus, randomly polarized light fed from the light source is converted into linearly polarized light with high efficiency and is illuminated in a uniform manner.

According to a third aspect of the present invention, there is provided a projection display device including:

the polarizing illumination device stated in claim 16, a color separator to separate light emitted from the polarizing illumination device into a plurality of primary colors of light;

a light valve serving as the subject to be illuminated to electrooptically modulate light fed from the color separator; and a projection lens to project light of picture image modulated by the light valve in an enlarged manner. With the above configuration, a projected image being excellent in uniformity and having comparatively high parallelism can be obtained. Moreover, since the polarizing illumination unit becomes very compact, the projection display panel becomes small-sized and can be suitably used, as a display device, for a time-sharing single plate projection liquid crystal display using an LCOS or for a projection liquid crystal display device using a microlens. As the color separating device, for example, a color filter can be employed. As the light valve, for example, the liquid crystal panel can be employed.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
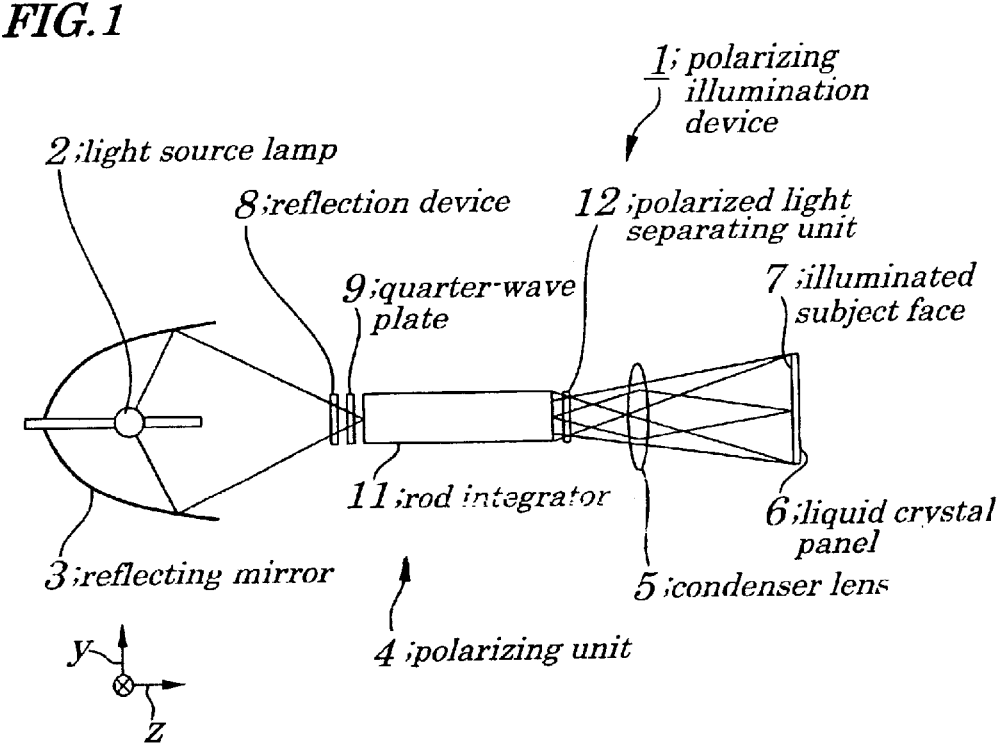
FIG. 1 is a cross-sectional diagram illustrating configurations of a polarizing illumination device according to a first embodiment of the present invention.
Figure 2:
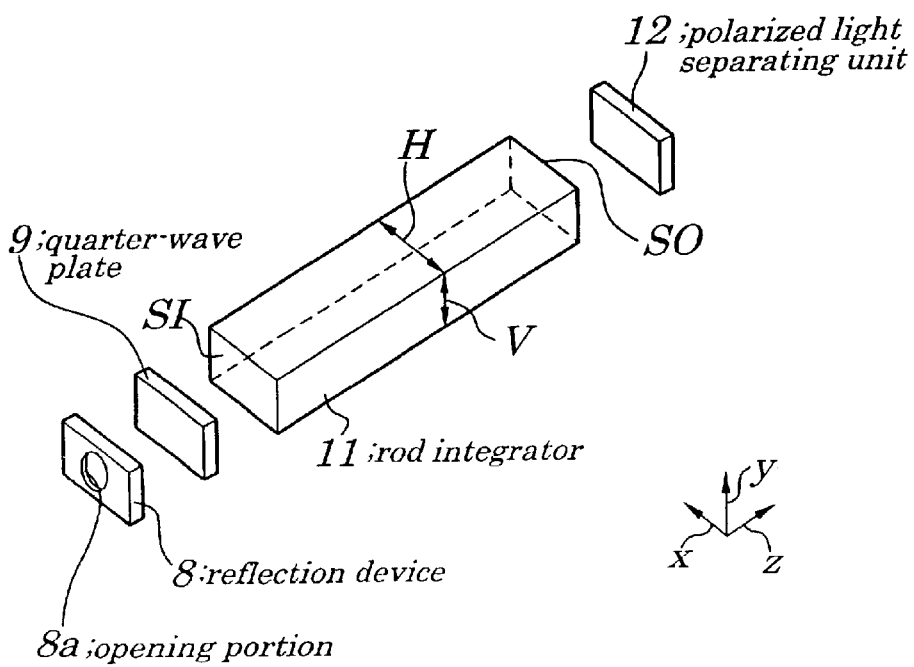
FIG. 2 is an exploded perspective view illustrating configurations of a polarizing unit being a main portion of the polarizing illumination device according to the first embodiment of the present invention.
Figure 3:
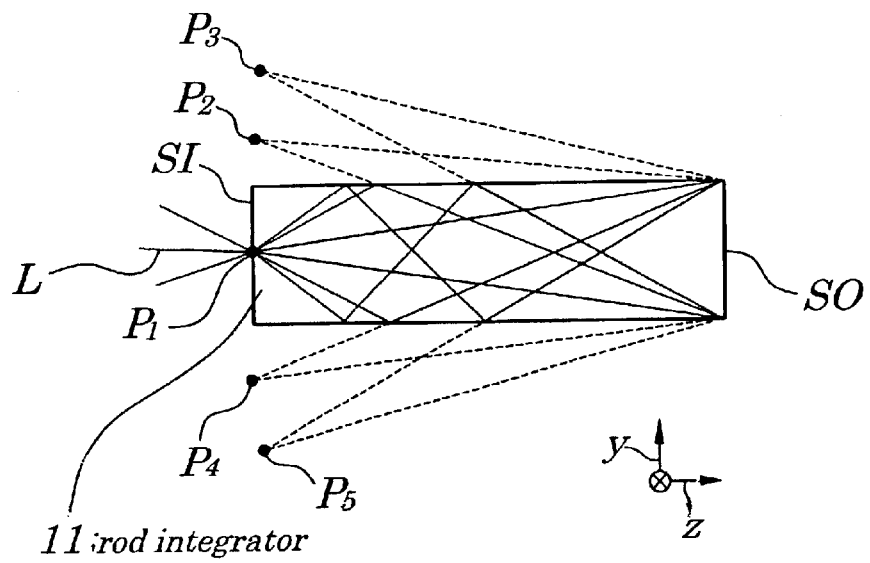
FIG. 3 is a diagram explaining a function of a rod integrator of the polarizing unit according to the first embodiment of the present invention.
Figure 4:
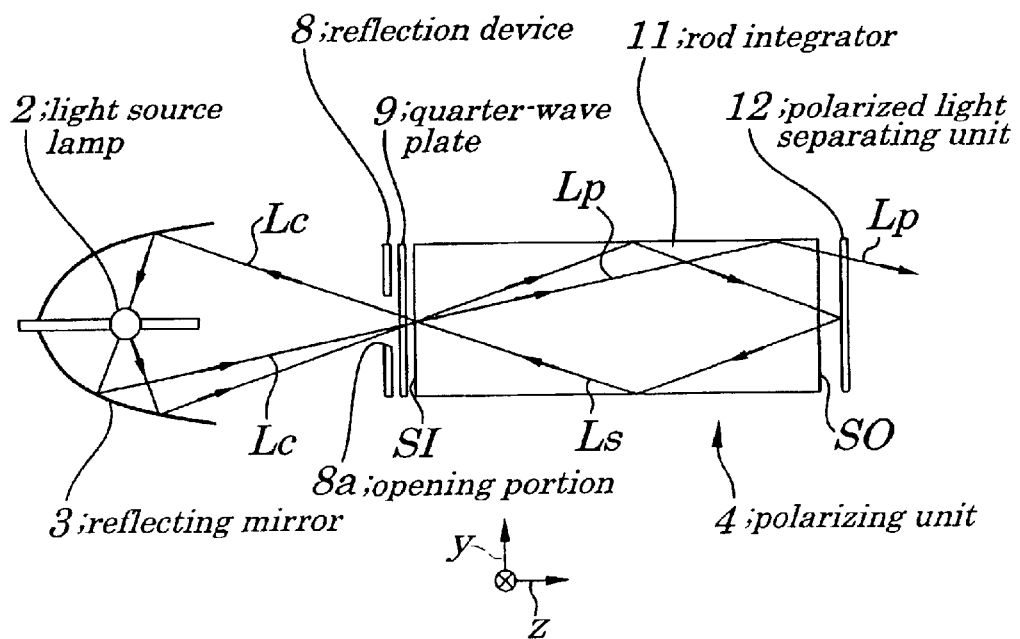
FIG. 4 is a diagram illustrating a function of the polarizing illumination device and explaining a state in which polarizing conversion of light transmitting in a reverse direction through an opening portion of a reflection device with an opening is performed according to the first embodiment of the present invention.
Figure 5:
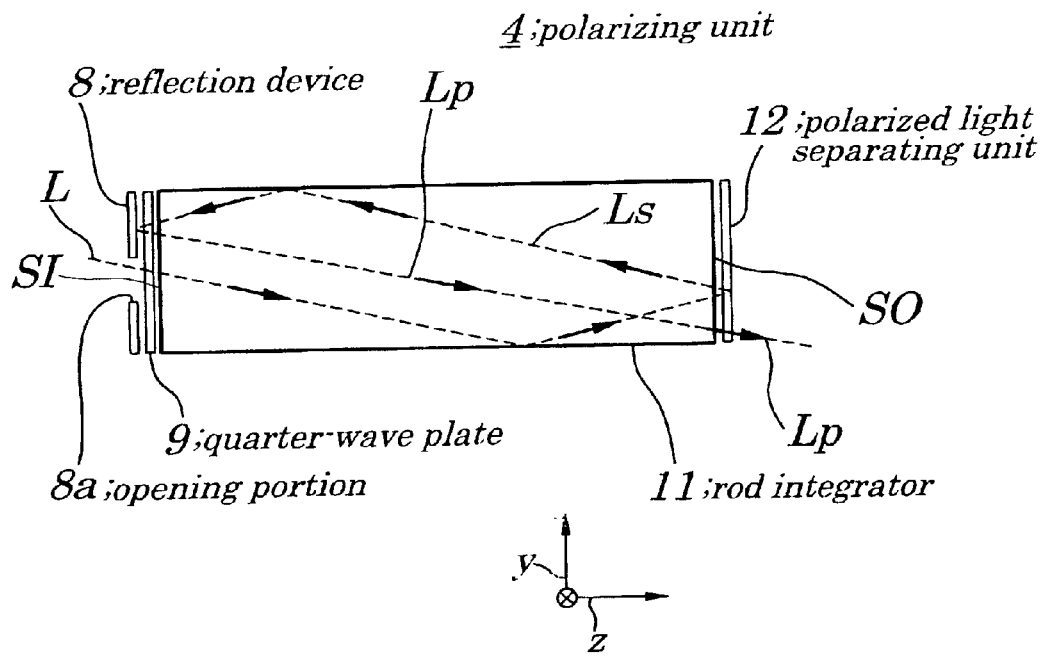
FIG. 5 is a diagram illustrating a function of the polarizing illumination device and explaining a state in which polarizing conversion of light being reflected off a reflecting device with an opening is performed according to the first embodiment of the present invention.
Figure 6:
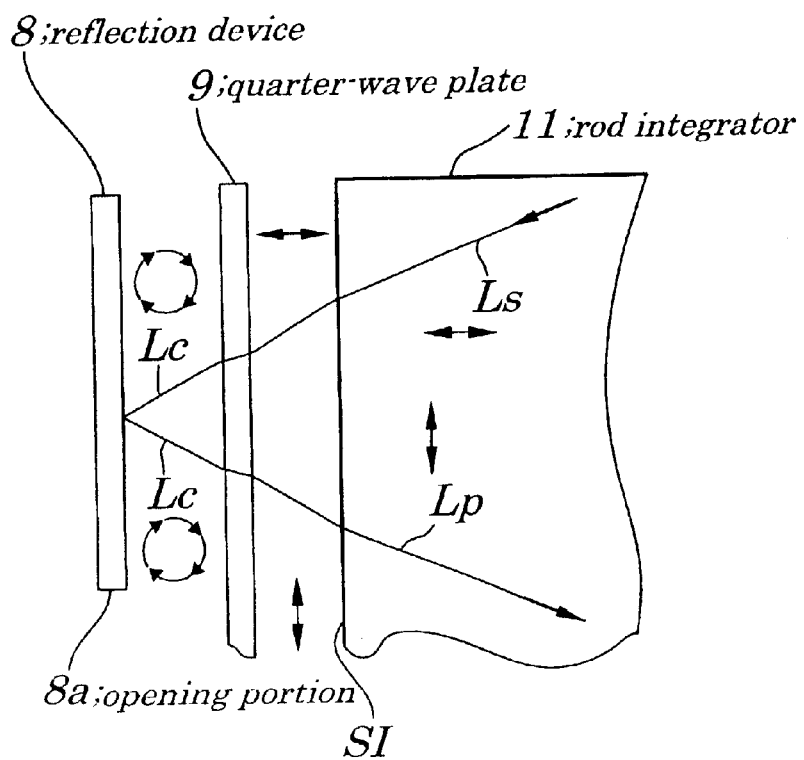
FIG. 6 is a diagram illustrating a function of the polarizing and illustrating device and explaining a state in which polarizing conversion of light being reflected off the reflecting device with the opening is performed according to the first embodiment of the present invention.

FIG. 1 is a cross-sectional view for illustrating configurations of a polarizing illumination device according to a first embodiment of the present invention, and FIG. 2 is an exploded perspective view for illustrating configurations of a polarizing unit serving as a main portion of the polarizing illumination device. Also, FIG. 3 is a diagram for explaining a function of a rod integrator of the polarizing unit, and FIG. 4 is a diagram for illustrating a function of the polarizing illumination device and for explaining a state in which polarizing conversion of light transmitting in a reverse direction through an opening portion of a reflection device with an opening. Also, FIG. 5 is a diagram for illustrating a function of the polarizing illumination device and for explaining a state in which polarizing conversion of light being reflected off the reflection device with the opening. Furthermore, FIG. 6 is a diagram for illustrating a function of the polarizing and for illustrating device and explaining a state in which polarizing conversion of light being reflected off the reflecting device with the opening.

The polarizing illumination device 1 of the first embodiment is used in a projection display device and, as shown in FIG. 1, is made up of a light source lamp (serving as a source of light) 2, a reflecting mirror 3 made up of an elliptic mirror (serving as a unit to gather light from a light source), a polarizing unit 4, and a condenser lens 5, in which these components are, in this order, arranged which are adapted to illuminate an illuminated subject face 7 of a liquid crystal panel 6 serving as a light valve. The polarizing unit 4, as shown in FIG. 2, is provided with a reflecting device 8 with an opening (being a part of a polarized light converting unit (not shown)) which has an opening portion in its central portion with a surface on a side of the illuminated subject face 7 being polished to a mirror smooth state, a quarter-wave plate 9 (being a part of the polarized light converting unit (not shown) and serving as a phase delaying device (not shown)), a rod integrator 11 (serving as a light guiding unit (not shown) and also as a columnar integrated device (not shown)), and a polarized light separating device 12 (serving as a unit separating polarized light). Here, the reflecting device 8 with the opening and the quarter-wave plate 9 make up the polarized light converting unit (not shown).

Preferably, the light source lamp 2 is a high pressure mercury lamp or a like which has a small area of a light emitting portion, that is, has a short length of an arc. The shorter the arc length is, the stronger a characteristic of point source of light is and therefore a focusing characteristic of light using the reflecting mirror 3 increases. Moreover, a light emitting component of the light source lamp 2 contains ultraviolet rays and thermal rays that do not contribute to display of an image and an ultraviolet ray removing filter (not shown) and thermal ray removing filter (not shown) are preferably placed in a light path existing between the light source lamp 2 and the reflecting device 8 with the opening. Also, a thin film to remove ultraviolet rays and thermal rays may be placed on a one-side face of the reflecting device 8 with the opening.

The reflecting mirror 3 gathers light fed from the light source lamp 2 being placed in a vicinity of its first focal point in a vicinity of its second focal point. Therefore, the reflecting mirror 3 is preferably placed so that a center of an end face of incident light of the rod integrator 11 coincides with its second focal point. Moreover, a reflecting mirror 3 with a parabolic face may be used as the reflecting mirror 3 instead of an elliptic mirror. In this case, by adding a lens adapted to gather light reflected off the reflecting mirror 3 with the parabolic face in a center of the end face of incident light of the rod integrator 11, same effects as were obtained by the reflecting mirror 3 can be achieved.

The reflecting device 8, as shown in FIG. 2, is provided with an opening portion 8a having no function of reflecting light in its center portion which serves as a taking-in port of light used when light fed from the light source lamp 2 is incident on the rod integrator 11. The reflecting portion, as described later, serves to improve efficiency of converting polarized light. As the reflecting device 8 with the opening, for example a device prepared by performing vacuum evaporation of a metal such as aluminum (Al) or a like, or of a multilayer of a dielectric on a surface of a plate-shaped glass substrate may be used. By providing a mask portion at the time of performing the vacuum evaporation, a non-evaporation region serving as the opening portion may be formed. Moreover, in order to reduce a loss in amounts of light, an antireflection film is preferably formed on a back of the reflecting device 8 with the opening. An optical axis of the quarter-wave plate 9 serving as the phase delaying device is arranged at an angle of 45° relative to an optical axis of the polarized light separating unit 12 or of the illuminated subject face 7 of the liquid crystal panel 6. As the quarter-wave plate 9, a film-type plate is known which is obtained by sandwiching a crystalline material such as calcite, rock crystal, or a like, an extended and transparent PVA (polyvinyl alcohol) film between TAC (triacetyl cellulose) films or a like.

As shown in FIG. 2, the rod integrator 11 is a square-pole shaped device. It is fabricated by using a transparent glass material or a plastic material to correspond to a wavelength region of illuminating light. The rod integrator 11 has an optically-polished light incident end face SI and a light outgoing end face SO and four side surfaces to be used for total reflection. The four side surfaces are polished to a mirror smooth state so as to serve as totally reflected surfaces. Moreover, it is preferable that the light incident end face SI and light outgoing end face SO have respectively an antireflection film (not shown) in order to reduce a loss in amounts of going light. It is also preferable that a cross section of the rod integrator 11 is rectangular with a length in its horizontal (transverse) direction being H and with a length in its vertical (longitudinal) direction being V and that a ratio of the length H to the length V is almost similar to that in a display region of the liquid crystal panel 6. Therefore, if the ratio of the length H to the length V in the display region of the liquid crystal panel 6 is 4:3, the ratio of the length H to the length V in the cross section of the rod integrator 11 is preferably 4:3. If the ratio in the display region of the liquid crystal panel 6 is 16:9, illuminating efficiency can be optimized by having the ratio of the length H and the length V in the cross section of the rod integrator 11 be also 16:9.

As shown in FIG. 3, an incident light L repeats side reflection within the rod integrator 11 or reaches the light outgoing end face SO without reflecting totally by the side face and forms a plurality of vertical secondary light sources P1, P2, P3, . . . P5. Moreover, in FIG. 3, to simplify descriptions, a Z-axis direction is used as a direction of travel and only light in a Y-Z cross section is shown. In the outgoing end face SO, since light is illuminated in a superimposing manner by many vertical secondary light sources P1, P2, P3, . . . P5, illumination having very high uniformity within a surface can be obtained. Also, since an image showing information about an illumination state on the light outgoing end face SO is formed on the surface to be illuminated 7 of the liquid crystal panel 6 by transmission through a condenser lens 5, uniform illumination can be achieved.

The polarized light separating device 12 operates to allow one component to be transmitted and another component to be reflected, out of linearly polarized light components whose polarized axes orthogonal to each other being contained in the randomly polarized incident light. For example, when linearly polarized light passing through the polarized light separating unit 12 is defined as "p-polarized light" and linearly polarized light reflecting off the polarized light separating device 12 as "s-polarized light", an image of p-polarized light having passed through the polarized light separating device 12 is formed on the illuminated subject face 7 of the liquid crystal panel 6 by transmission through the condenser lens 5 being placed at a back of the polarized light separating device 12.

As the polarized light separating device 12, ProFlus (trademark) manufactured by MOXTEK in America, HMF (product name of Heart Management Filter) by Sumitomo 3M corporation or a like are known. The ProFlus is obtained by forming a fine grid made of aluminum having a width of about 65 nm, with a height of 100 to 200 nm, and with a pitch of 140 nm on a glass substrate and is a grid-type polarized device adapted to have a polarized light component, contained in randomly polarized light being entered, in a vibrational direction being orthogonal to a direction of a length of the grid, be passed, whereas a polarized component, contained in randomly polarized light being entered, in a vibrational direction being parallel to a direction of a length of the grid be reflected. Moreover, the HMF is used by being stuck to a glass substrate or a like through an acrylic pressure sensitive adhesive being a resin film having a polyester multilayer structure. The HMF has a p-polarized component contained in the randomly polarized light be passed and an s-polarized component contained in the randomly polarized light be reflected. In any case, by providing an antireflection film at a back of a polarized light separating surface of a substrate, a loss in amounts of light can be reduced.

The condenser lens 5 is arranged in such a manner that an image obtained from a light outgoing end face SO of the rod integrator 11 is formed on an illuminated subject face 7 of the liquid crystal panel 6. By the condenser lens 5, the light outgoing end face SO and the illuminated subject face 7 of the rod integrator 11 are put in an optically conjugated state. The liquid crystal panel 6 can be configured so that a Twisted Nematic (TN) liquid crystal is sandwiched between the two transparent glass substrates and a TFT (Thin Film Transistor) is formed as a switching element. Moreover, as the liquid crystal, besides the TN-type liquid crystal, a ferroelectric-type liquid crystal or an antiferroelectric-type liquid crystal, a horizontally-oriented type liquid crystal or a vertically-oriented type liquid crystal, and a high molecular-diverging type liquid crystal can be used. At back and rear sides of two glass substrates with the liquid crystal being sealed is placed a polarizing plate (not shown). In the present invention, it is expected that, in addition to the transmission-type active matrix TFT liquid crystal panel, a reflection-type LCOS or a like is used.

Next, by referring to FIG. 4 to FIG. 6, functions of the polarizing illumination device 1 of the first embodiment are described below.

Randomly polarized light fed from the light source lamp 2 is condensed by the reflecting mirror 3. The condensed light transmits through an opening portion 8a of the reflecting device 8 and the quarter-wave plate 9 and enters the light incident end face SI of the rod integrator 11 and then reaches the light outgoing end face SO while side reflection is repeated and is output. Either component Lp (FIG. 4) (here being handled as p-polarized light) only out of two linearly polarized light components being orthogonal to each other contained in randomly polarized light being incident in the polarized light separating unit 12 is transmitted and an image is formed by transmission through the condenser lens 5 on the illuminated subject face 7 of the liquid crystal panel 6.

Processes in which another component Ls (here being handled as s-polarized light) reflected off the polarized light separating unit 12 is converted into the p-polarized light are shown in FIG. 4 and FIG. 5. The s-polarized light component light Ls moves backward to the light source lamp 2. The s-polarized component light Ls enters the light outgoing end face SO of the rod integrator 11 and passes through the rod integrator 11 while side reflection is being repeated and reaches the incident light end face SI and is then output. Next, the output light is transmitted through the quarter-wave plate 9, however, at this point, since a phase delay of "π/2" occurs in the s-polarized light among components in a direction of an optical axis (speedy axis, delayed axis) of the quarter-wave plate 9 being tilt by an angle of 45°, the output light is converted to circularly polarized light Lc.

As shown in FIG. 4, the circularly polarized light Lc transmitting through the opening portion 8a of the reflecting device 8 in a reverse direction is reflected off the reflecting mirror 3 and returns to a vicinity of the light-emitting portion of the light source lamp 2. Thereafter, this light is used again as a light source for newly polarized light and enters the rod integrator 11 through the reflecting device 8 with the opening and the quarter-wave plate 9. That is, the circularly polarized light Lc, immediately before its entrance into the rod integrator 11, again transmits through the quarter-wave plate 9. At this point, since a phase delay of "π" in total occurs among components in optical axes (speedy axis and delayed axis) of the quarter-wave plate 9 being tilt by an angle of 45°, the circularly polarized light Lc is converted to a p-polarized light and finally transmits through the polarized light separating unit 12, which contributes to illumination on the illuminated subject face 7 of the liquid crystal panel 6.

On the other hand, the circularly polarized light Lc being reflected without passing through the opening portion 8a of the reflecting device 8, as shown in detail by FIG. 5 or by FIG. 6 which is a enlarged diagram of a neighboring region of the light incident end face SI of the rod integrator 11, since it further transmits through the quarter-wave plate 9, is converted to the p-polarized light. Finally, the circularly polarized light Lc transmits the polarized light separating unit 12, which contributes to illumination on the illuminated subject face 7 of the liquid crystal panel 6. Thus, most of the s-polarized light component Ls being reflected off the polarized light separating unit 12, since it transmits further twice through the quarter-wave plate 9, is converted into the p-polarized light, thus enabling it to be used as illuminating light and, therefore, efficiency of using the light source can be further improved.

Moreover, the quarter-wave plate 9, if employing a film-type quarter-wave plate, may be stuck through the pressure sensitive adhesive on the light incident end face SI of the rod integrator 11. Furthermore, the quarter-wave plate 9 may be stuck to the reflecting device 8 with the opening. Also, the polarized light separating unit 12, if employing a quarter-wave plate of a film type such as an HMF, may be stuck to the light outgoing end face SO of the rod integrator 11. As a result, a loss in amounts of light and a number of components can be reduced.

As described above, according to the first embodiment, randomly polarized light Lr fed from the light source lamp 2 is separated into linearly polarized lights (p-polarized light Lp and s-polarized light Ls) whose polarizing directions orthogonal to each other and, most of the s-polarized light Ls being reflected off the polarized light separating unit 12, since it further transmits twice through the quarter-wave plate 9, is converted into the p-polarized light, thus enabling linearly polarized light (p-polarized light Lp) having same polarized directions to be obtained which can be used as illuminating light having unified polarized directions. As a result, efficiency of using the light source can be further improved. Moreover, since light sources are multiplied by using the rod integrator 11, high uniformity of illumination can be obtained. Also, since, by using the condenser lens 5, an image showing information about illumination in a light outgoing end face SO of the rod integrator 11 is formed on the liquid crystal panel 6, illumination having a reduced diverging angle of light contained in illuminating luminous flux and having highly parallelism can be achieved. Furthermore, in addition to high efficiency of using the light source, high uniformity of illumination and excellent parallelism of illuminating light as described above, by forming the reflecting device 8 with the opening, the quarter-wave plate 9, the rod integrator 11, and the polarized light separating unit 12 in an integrated manner, the polarizing illumination device 1 and projection display device can be made small and lightweight.

Second Embodiment

Figure 7:
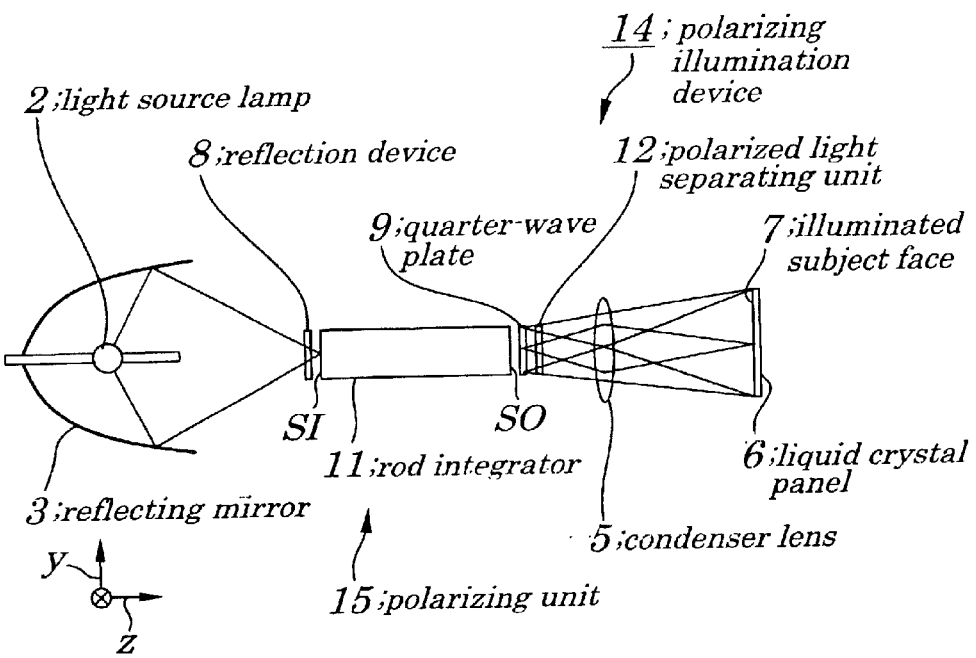
FIG. 7 is a cross-sectional view showing configurations of a polarizing illumination device according to a second embodiment of the present invention.

FIG. 7 is a cross-sectional view showing configurations of a polarizing illumination device 14 according to a second embodiment of the present invention. In the first embodiment, a rod integrator 11 is sandwiched between a quarter-wave plate 9 and a polarized light separating unit 12 and on a side of a light incident end face SI is placed the quarter-wave plate 9 and, on a side of a light outgoing end face SO is placed the polarized light separating unit 12, while, in the second embodiment, both the quarter-wave plate 9 and polarized light separating unit 12 are placed on the side of the light outgoing end face SO of the rod integrator 11. In the second embodiment, as in the case of the first embodiment, randomly polarized light fed from the light source lamp 2 can be highly effectively converted into p-polarized light which can be used as illuminating light and high efficiency of using the light source can be achieved. Configurations except those described above are same as those in the first embodiment and their descriptions are simplified accordingly.

The polarizing illumination device 14, as shown in FIG. 7, is provided with a light source lamp 2, a reflecting mirror 3, a polarizing unit 15, and a condenser lens 5 and is adapted to illuminate an illuminated subject face 7 of a liquid crystal panel 6 serving as a light valve. The polarizing unit 15 has a reflecting device 8 with an opening, the rod integrator 11, a quarter-wave plate 9, and a polarized light separating unit 12, which are arranged in order. Here, the reflecting device 8 with the opening and quarter-wave plate 9 make up a polarized light converting unit. Moreover, in the embodiment, the reflecting device 8 with the opening may be formed by vacuum evaporation on a light incident face SI on the rod integrator 11. Also, the quarter-wave plate 9, if a film-type quarter-wave plate is used, may be stuck on the light outgoing end face SO of the rod integrator 11. By configuring above, a loss in amounts of light and a number of components can be reduced.

Thus, according to the second embodiment, same effects as obtained in the first embodiment can be achieved. That is, as in the case of the first embodiment, randomly polarized light of the light source lamp 2 can be converted, at high efficiency, into p-polarized light which can be used as illuminating light, thus achieving high efficiency of using the light source.

Third Embodiment

Figure 8:
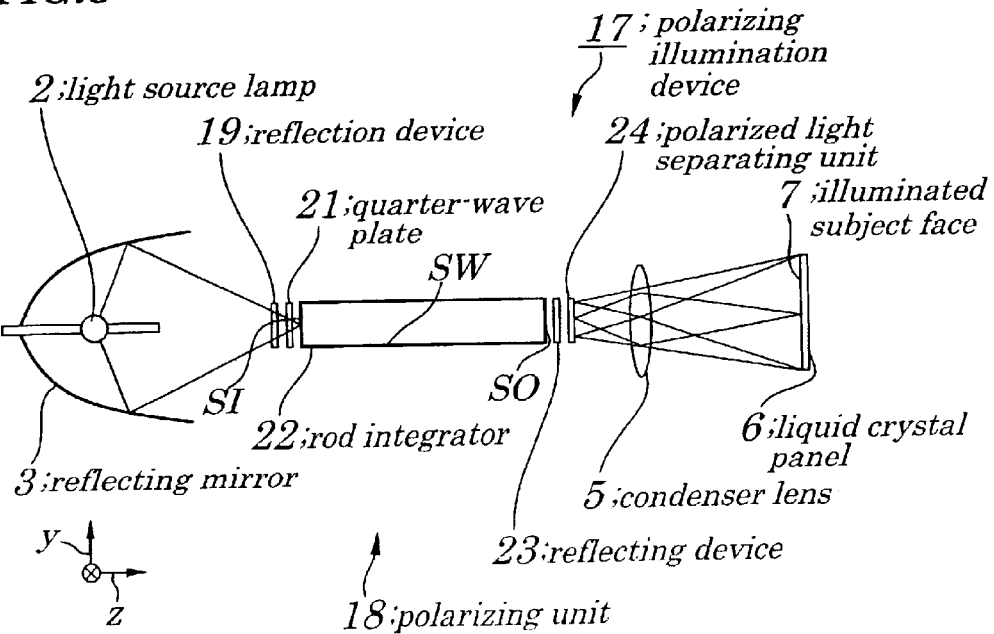
FIG. 8 is a cross-sectional view illustrating configurations of a polarizing illumination device according to a third embodiment of the present invention.
Figure 9:
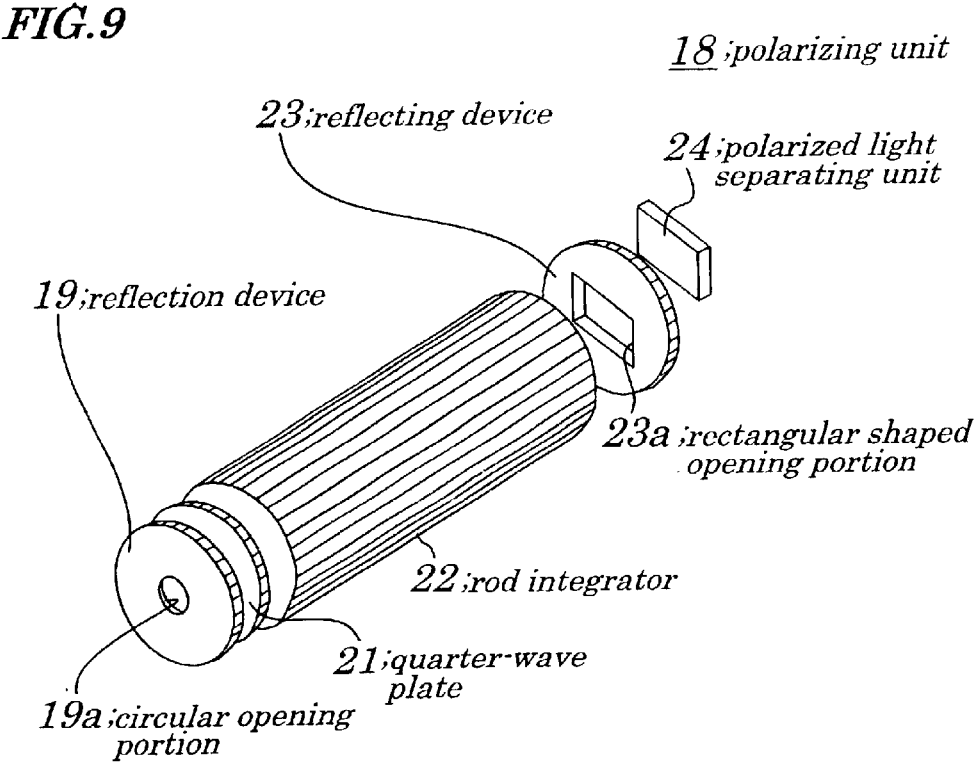
FIG. 9 is an exploded perspective view illustrating a polarizing unit being a main component of the polarizing illumination device according to the third embodiment of the present invention.
Figure 10:
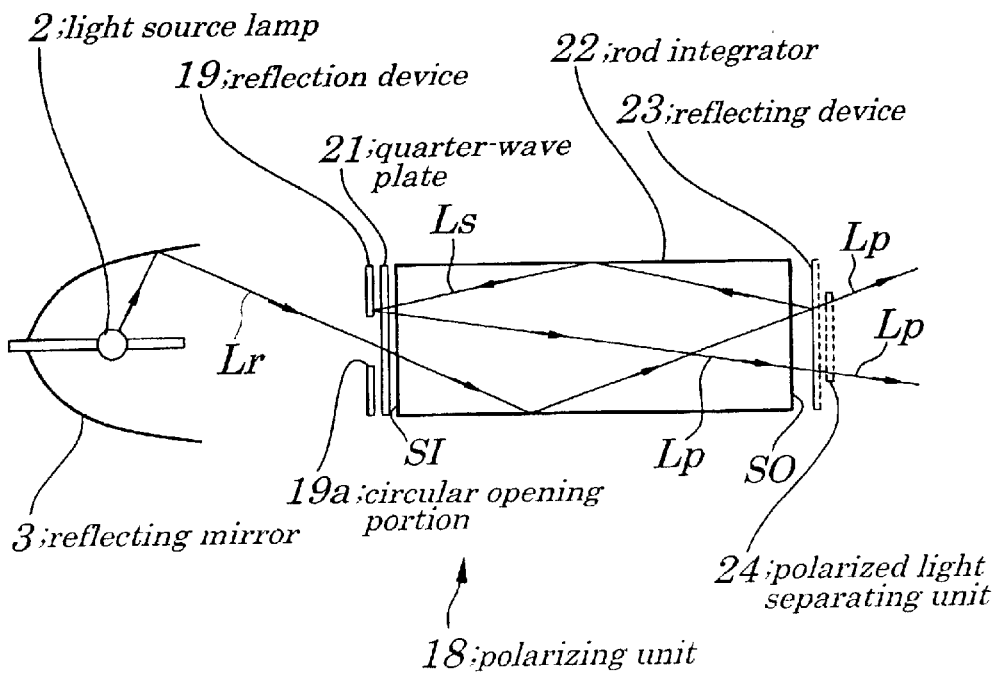
FIG. 10 is a diagram explaining functions of the polarizing illumination device according to the third embodiment of the present invention.
Figure 11:
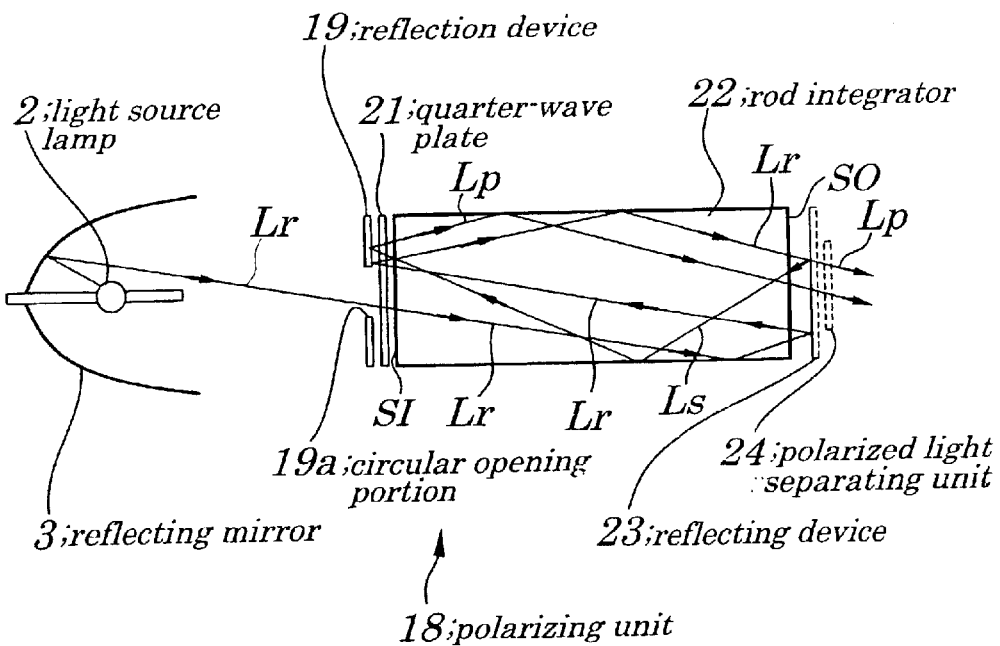
FIG. 11 is a diagram explaining functions of the polarizing illumination device according to the third embodiment of the present invention.
Figure 12:
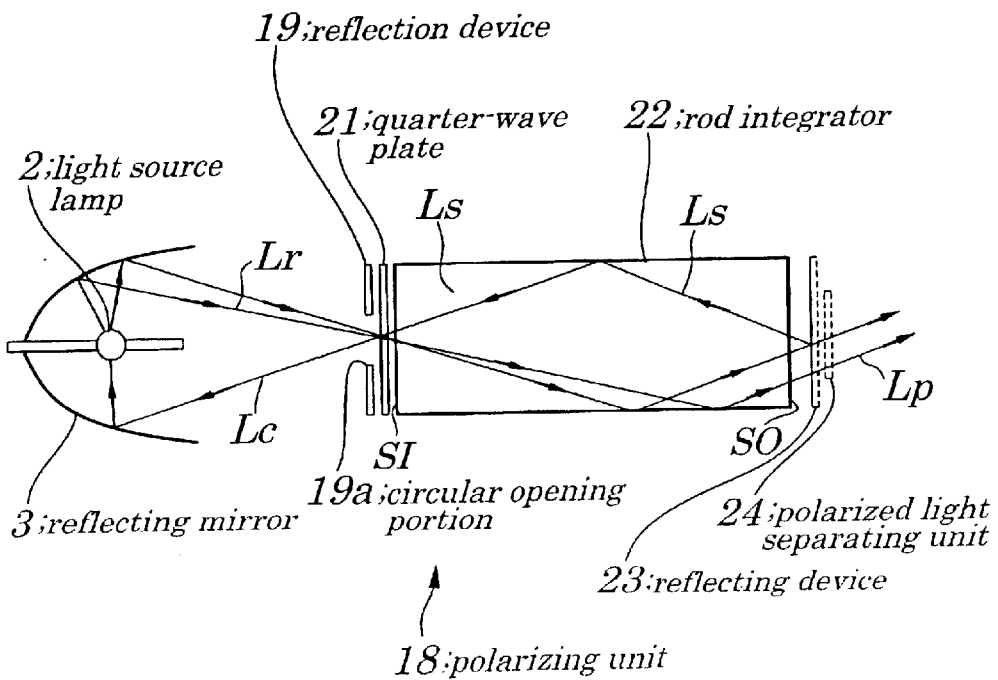
FIG. 12 is a diagram explaining functions of the polarizing illumination device according to the third embodiment of the present invention.

FIG. 8 is a cross-sectional view illustrating configurations of a polarizing illumination device according to a third embodiment of the present invention. FIG. 9 is an exploded perspective view illustrating a polarizing unit being a main component of the polarizing illumination device according to the third embodiment. FIGS. 10 to 12 are a diagram explaining functions of the polarizing illumination device according to the third embodiment. The polarizing illumination device in the third embodiment differs greatly from that employed in the first embodiment in that, instead of a square-pole-shaped rod integrator 11, a circularly cylindrical rod integrator 22 is employed. Moreover, as a result, on a side of a face to be illuminated of the circularly cylindrical rod integrator 22 is placed a reflecting device 23 with a rectangular shaped opening.

The polarizing illumination device 17 of the third embodiment, as shown in FIG. 8, is provided with a light source lamp 2, a reflecting mirror 3 made up of elliptic mirrors to gather luminous flux being emitted from the light source lamp 2, a polarizing unit 18, and a condenser lens 5, which are arranged in this order and are adapted to apply light to an illuminated subject face 7 of a liquid crystal panel 6.

The polarizing unit 18, as shown in FIG. 8 and FIG. 9, is provided with a reflecting device 19 (being a part of a polarized light converting unit) in which a circular opening portion 19a is formed in a center and a face on a side of a face to be illuminated is polished to a mirror smooth state, a quarter-wave plate 21, the reflecting device (with a rectangular opening) 23 in which the rectangular shaped opening portion 23a is formed at its center and a face on a side of the light source is polished to a mirror smooth state, and a polarized light separating unit 24, which are arranged in this order. Here, the reflecting device 19 with the circular opening and the quarter-wave plate 21 make up a polarized light converting unit.

Ultraviolet rays and/or thermal rays not contributing to displaying of an image are contained in a light component emitted from the light source lamp 2 and, in order to remove them, it is desirous that an ultraviolet ray and thermal ray removing filter are provided in an optical path between the light source lamp 2 and the reflecting device 19 with a circular opening. Also, a thin film to remove ultraviolet rays and thermal rays may be formed on one face of the reflecting device 19 with a circular opening.

The reflecting mirror 3 gathers light emitted from the light source lamp 2 placed near its first focus in a vicinity of its second focus. Therefore, it is desirous that the reflecting mirror 3 is placed so that a center portion of light incident end face of the circularly cylindrical rod integrator 22 is placed in the vicinity of its second focus. The converged luminous flux being emitted from the light source lamp 2 and being light-gathered by the reflecting mirror 3 forms an image of the light source lamp 2 on the light incident end face of the circularly cylindrical rod integrator 22. In the embodiment, as the reflecting mirror 3, instead of the elliptic mirrors, a reflecting mirror with a parabolic face may be used. In this case, by additionally mounting at least one lens to gather light reflected off the reflecting mirror with a parabolic face at a center place of the light incident end face of the circularly cylindrical rod integrator 22, same effects as obtained by using the reflecting mirror 3 can be achieved.

The reflecting device 19, as shown in FIG. 9, is provided with a circular opening portion 19a having no reflecting function in the center position and serves as a taking-in port used when light fed from the light source lamp 2 is incident on the circularly cylindrical rod integrator 22. The reflecting portion is effective in improving efficiency of converting polarized conversion as described later. As the reflecting device 19 with a circular opening, for example, a reflecting device obtained by performing vacuum evaporation of metal such as aluminum or a like or of a dielectric multilayer film on a face of a flat-plate shaped glass substrate may be used. In this case, when the vacuum evaporation or a like is performed, by providing a mask portion, a non-evaporation region serving as an opening portion may be formed. Moreover, in order to reduce a loss in amounts of light, an antireflection film may be formed at its back.

The quarter-wave plate 21 serving as a phase delaying device, when its optical axis is placed in such a manner that an angle of 45° is formed relative to a vibrational direction of incident linearly polarized light, converts linearly polarized light into circularly polarized light and, when the circularly polarized light enters, converts it into linearly polarized light. The circularly cylindrical rod integrator 22, as shown in FIG. 9, is a transparent circularly cylindrical optical device and is fabricated using a transparent glass material or a plastic material to correspond to a wavelength region of illuminating light. The circularly cylindrical rod integrator 22 has a light incident end face SI being optically polished, a light outgoing portion SO, and a surrounding side face SW used for total reflection and the surrounding side face SW is polished to a mirror smooth state so as to serve as a total reflection face. Moreover, it is desirous that the light incident end face SI and light outgoing end face SO are coated with an antireflection film to reduce a loss in amounts of the outgoing light.

The reflecting device with a rectangular opening 23 has the rectangular shaped opening portion 23a and is placed in the vicinity of the light outgoing end face SO of the circularly cylindrical rod integrator 22 and, as in the case of the reflecting device 19 with a circular opening, uses a device obtained by performing vacuum evaporation of metal such as aluminum or a dielectric multilayer film on a face of a flat plate-shaped glass substrate. Here, an aspect ratio of the opening portion 23a of the reflecting device with a rectangular opening 23 is preferably similar to that of a surface to be illuminated 7. With the rectangular shaped opening portion 23a of the reflecting device with a rectangular opening 23, rectangular luminous flux is entered into the polarized light separating unit 24. If an aspect ratio of the display region in the liquid crystal panel 6 serving as the illuminated subject face 7 is 4:3, it is desirous that an aspect ratio of the rectangular shaped opening portion 23a is 4:3 and, if an aspect ratio of the display region in the liquid crystal panel 6 is 16:9, by making the aspect ratio of the opening portion 23a be 16:9, efficiency of illumination is optimized.

The polarized light separating unit 24 is placed on a side of the subject face 7 to be illuminated of the reflecting device 23 with a rectangular opening portion 23a and allows one component to be transmitted and causes another component to be reflected out of linearly polarized light components whose polarizing axes orthogonal to each other contained in randomly polarized incident light. For example, when linearly polarized light passing through the polarized light separating unit 24 is defined as "p-polarized light" and linearly polarized light-reflecting off the polarized light separating unit 24 as "s-polarized light", an image of p-polarized light having passed through the polarized light separating unit 24 is formed on the illuminated subject face 7 of the liquid crystal panel 6 by transmission through the light-gathering lens 5 being placed on a side of the illuminated subject face 7 of the polarized light separating unit 24. The condenser lens 5 is arranged so that an image existing on the rectangular shaped opening portion 23a of the reflecting device with the rectangular opening 23 is formed on the illuminated subject face 7 of the liquid crystal panel 6. The rectangular shaped opening portion 23a and the illuminated subject face 7 are put on an optically conjugated state by existence of the condenser lens 5. The illuminated subject face 7 of the liquid crystal panel 6 is so configured that a TN (Twisted Nematic)-type crystal is sandwiched between two transparent glass substrates and a TFT ((Thin Film Transistor) film serving as a switching element is formed.

Next, functions of the polarizing illumination device 17 (FIG. 8) of the embodiment will be described by referring to FIG. 10 to FIG. 12. Randomly polarized light Lr fed from the light source lamp 2, as shown in FIG. 10, is gathered by the reflecting mirror 3 and the gathered light transmits through the circular opening portion 19a of the reflecting device 19 and the quarter-wave plate 21. The above gathered light, after having entered the light incident end face SI of the circularly cylindrical rod integrator 22, reaches the light outgoing end face SO while repeating reflection by the surrounding side face SW and is emitted therefrom. Thereafter, the randomly polarized light Lr, after having reached the rectangular shaped opening portion 23a of the reflecting device with rectangular opening 23, passes through the rectangular shaped opening portion 23a and reaches the polarized light separating unit 24. Either component Lp (here being handled as p-polarized light Lp) only of two linearly polarized light components intersecting each other at right angles contained in randomly polarized light being incident in the polarized light separating unit 24 are transmitted and an image is formed by transmission through the condenser lens 5 on the illuminated subject face 7 of the liquid crystal panel 6.

Another component (here being handled as s-polarized light Ls) reflected off the polarized light separating unit 24 enters the light outgoing end face SO of the circularly cylindrical rod integrator 22 and travels backward from the light outgoing end face SO to a side of the light source lamp 2 and transmits within the circularly cylindrical rod integrator 22, while repeating side face reflection, and then returns back to the light incident end face SI and is emitted therefrom. Then, the s-polarized light Ls passes through the quarter-wave plate 21 and, at this point, the s-polarized light Ls is converted into a circularly polarized light Lc. As shown in FIG. 10 to FIG. 12, the circularly polarized light Lc not transmitting through but being reflected off the circular opening portion 19a of the reflecting device 19, again transmits the quarter-wave plate 21 and is converted into the p-polarized light Lp. The p-polarized light Lp travels toward the illuminated subject face 7 within the circularly cylindrical rod integrator 22 and reaches the reflecting device with the rectangular opening 23 and, after having passed through the rectangular shaped opening portion 23a, transmits through the polarized light separating unit 24 and serves for illumination on the illuminated subject face 7 of the liquid crystal panel 6 through use of the condenser lens 5. Thus, illuminating luminous flux having unified polarization directions can be obtained.

Moreover, as shown in FIG. 12, the s-polarized light Ls being reflected and returning to the circularly cylindrical rod integrator 22 and then reaching the circular opening portion 19a of the reflecting device 19 transmits through the quarter-wave plate 21 and becomes circularly polarized light Lc and is reflected off the reflecting mirror 3 and returns to portions surrounding a light emitting portion of the light source lamp 2. The circularly polarized light Lc is thereafter re-used as light source light of new circularly polarized light. The circularly polarized light Lc is diverged by the reflecting mirror 3 and enters the light incident end face SI of the circularly cylindrical rod integrator 22. The circularly polarized light Lc again transmits through the quarter-wave plate 21 immediately before entering the circularly cylindrical rod integrator 22.

At this point, since a phase delay by "π" in total occurs among components existing in an optical axis (speedy axis and delayed axis) of the quarter-wave plate 9 being tilt by an angle of 45°, the circularly polarized light is then converted to p-polarized light and is finally transmitted through the polarized light separating unit 24, which contributes to illumination on the illuminated subject face 7 of the liquid crystal panel 6. Thus, the randomly polarized light Lr emitted from the light source lamp 2 is separated into linearly polarized light (p-polarized light Lp and s-polarized light Ls) whose polarizing directions orthogonal to each other and most of the s-polarized light Ls being reflected off the polarized light separating unit 24, since it transmits further twice through the quarter-wave plate 21, is converted to the p-polarized light Lp, thus enabling linearly polarized light (p-polarized Lp) having same polarizing directions to be obtained, which is used as illuminating light having unified polarizing directions.

Moreover, as shown in FIG. 11, in the reflecting device with a rectangular opening 23, the randomly polarized light Lr reaching not the opening portion 23a but a reflecting face is reflected off the reflecting face and its traveling direction is changed to a side of the light source lamp 2 and travels, while side-face reflection is being repeated, within the circularly cylindrical rod integrator 22. The randomly polarized light Lr, in the quarter-wave plate 21 and the reflecting device 19 with a circular opening, changes its traveling direction into a direction of the light outgoing end face SO of the circularly cylindrical rod integrator 22 and travels further. The p-polarized light Lp, when having passed through the rectangular shaped opening portion 23a of the reflecting device with the rectangular opening 23, transmits the polarized light separating unit 24 and contributes to illumination and the s-polarized light Ls, when having passed through the rectangular shaped opening portion 23a of the reflecting device with the rectangular opening 23, is reflected off the polarized light separating unit 24. The reflected s-polarized light Ls travels toward the light source lamp 2 within the circularly cylindrical rod integrator 22 and, in the quarter-wave plate 21 and the reflecting device 19 with the circular opening, is converted into p-polarized light Lp and then transmits through the polarized light separating unit 24 and contributes to illumination on the illuminated subject face 7 of the liquid crystal panel 6.

Moreover, if a quarter-wave plate of a film type is used as the quarter-wave plate 21, it may be stuck through a pressure sensitive adhesive to the light incident end face SI of the circularly cylindrical rod integrator 22. This causes a face being in contact with air to be reduced, thus leading to reduction of a loss in amounts of light. Also, the quarter-wave plate 21 may be stuck to a back of the reflecting device 19 with the circular opening. This enables the loss in amounts of light and a number of required components to be reduced. Also, the polarized light separating unit 24, if a device of a film type such as the "HMS" or a like, may be stuck to a back of the reflecting device with the rectangular opening 23. Furthermore, the reflecting device with the rectangular opening 23 may be stuck to the light outgoing end face SO of the circularly cylindrical rod integrator 22. This enables reduction of the loss in amounts of light and of the number of required components.

Thus, according to the embodiment, randomly polarized light Lr emitted from the light source lamp 2 is separated into linearly polarized light (p-polarized light Lp and s-polarized light Ls) whose polarizing directions orthogonal to each other. Most of the above s-polarized light Ls being reflected off the polarized light separating unit 24, since it further transmits twice through the quarter-wave plate 21, is also converted into p-polarized light Lp and, as a result, linearly polarized light (p-polarized light Lp) having same polarizing directions can be obtained thus enabling it to be used as illuminating light having unified polarizing directions. Therefore, efficiency of using the light source can be improved. Also, since light sources are multiplied by using the circularly cylindrical rod integrator 22, high uniformity of illumination can be obtained. Also, since, by using the condenser lens 5, an image showing information about illumination in a light outgoing end face SO of the circularly cylindrical rod integrator 22 is formed on the liquid crystal panel 6, illumination having a reduced diverging angle of light contained in illuminating luminous flux and having highly parallelism can be achieved. Also, in addition to high efficiency of using the light source, high uniformity of illumination and excellent parallelism of illuminating light as described above, by forming the reflecting device 19 with the circular opening, the quarter-wave plate 21, the circularly cylindrical rod integrator 22, the reflecting device with the rectangular opening 23, and the polarized light separating unit 24 in an integrated manner, the polarizing illumination device and projection display device can be made small and lightweight.

Furthermore, since the circularly cylindrical rod integrator 22 that can provide easy working is used, when compared with, for example, the square-pole-shaped rod integrator, the polarizing unit 18 and polarizing illumination device can be fabricated at lower costs. That is, in the case of the square-pole shaped rod integrator employed in the first and second embodiments, in order to achieve uniformity of light, since the four side faces used for internal reflection has to be worked and to be polished with high accuracy, mass production and reduction in costs are difficult, however, in the case of the circularly cylindrical rod integrator 22 of the third embodiment, compared with the square-pole shaped rod integrator, since less working processes are required, reduction in costs can be achieved.

Here, in the reflecting device with the rectangular opening 23, the randomly polarized light Lr having not reached the rectangular shaped opening portion 23a but the reflecting face repeats side face reflection within the circularly cylindrical rod integrator 22 and is finally converted to a polarized component that can transmit through the polarized light separating unit 24 which is used as illuminating light and therefore even if the reflecting device with the rectangular opening 23 is mounted, it is possible to fabricate an illumination optical system having high efficiency of using the light source.

That is, in the optical system using a circularly cylindrical rod integrator 22, since a light outgoing end face SO and the illuminated subject face 7 of the liquid crystal panel 6 are in an optical conjugated state, in order to correspond to the rectangular illuminated subject face 7 of the liquid crystal panel 6, it is necessary that the light outgoing end face SO of the circularly cylindrical rod integrator 22 is rectangular. However, since the reflecting device with the rectangular opening 23 is placed in the vicinity of the light outgoing end face SO, it is possible to illuminate the illuminated subject face 7 of the liquid crystal panel 6 in a manner that a shape of an area being illuminated is rectangular and to avoid decreases in illuminating efficiency and in efficiency of using the light source.

Fourth Embodiment

Figure 13:
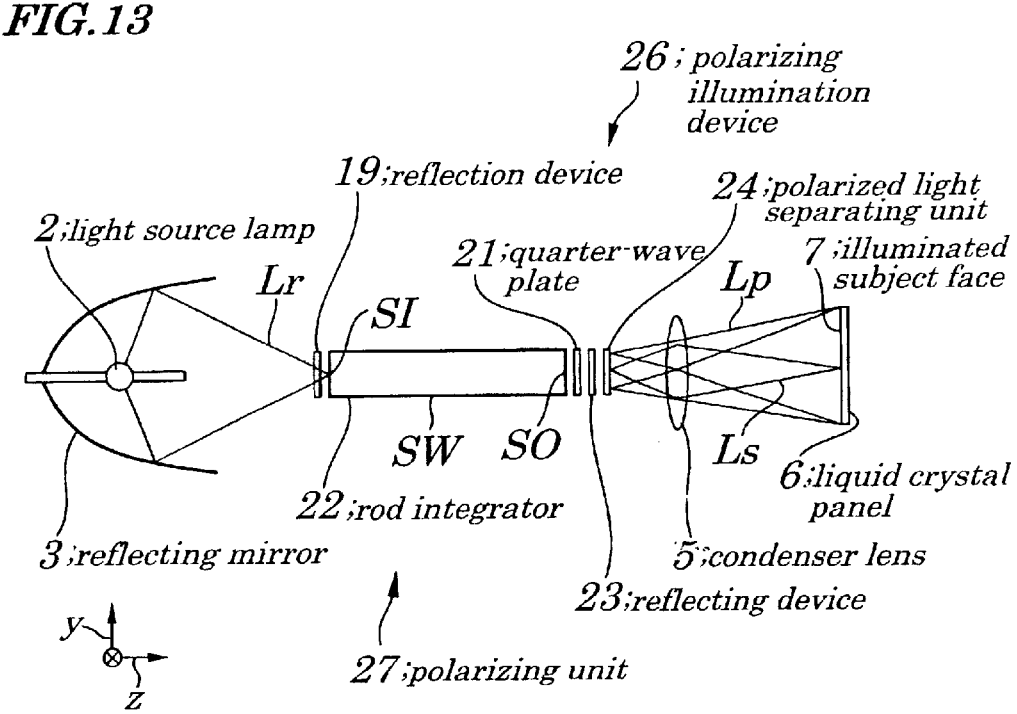
FIG. 13 is a cross-sectional diagram showing configurations of a polarizing illumination device according to a fourth embodiment of the present invention.
Figure 14:
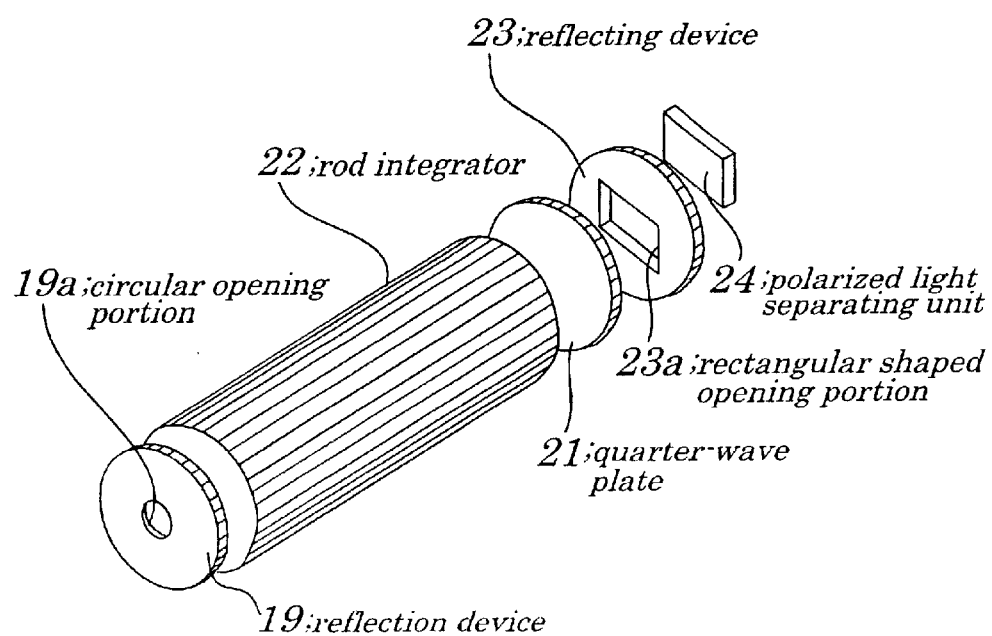
FIG. 14 is an exploded perspective view illustrating configurations of a polarizing unit of the polarizing illumination device according to the fourth embodiment of the present invention.

FIG. 13 is a cross-sectional diagram showing configurations of a polarizing illumination device 26 of a fourth embodiment of the present invention. FIG. 14 is an exploded perspective view illustrating configurations of a polarizing unit 27 of the polarizing illumination device 26 of the fourth embodiment. In the third embodiment, a circularly cylindrical rod integrator 22 is sandwiched between a quarter-wave plate 21 and a polarized light separating unit 24 and on the side of a light incident end face SI is placed the quarter-wave plate 21 and, on a side of a light outgoing end face SO is placed the polarized light separating unit 24, while, in the fourth embodiment, both the quarter-wave plate 21 and the polarized light separating unit 23 are placed on a side of the light outgoing end face SO of the circularly cylindrical rod integrator 22. In the fourth embodiment, as in the case of the third embodiment, randomly polarized light fed from a light source lamp 2 can be highly effectively converted into p-polarized light which can be used as illuminating light and therefore high efficiency of using the light source can be achieved. Configurations except those described above are same as those in the third embodiment and their descriptions are simplified accordingly.

The polarizing illumination device 26, as shown in FIG. 13, is provided with a light source lamp 2, a reflecting mirror 3 made up of an elliptic mirror, a polarizing unit 27, and a condenser lens 5 and these components are arranged in this order which are adapted to illuminate an illuminated subject face 7 of a liquid crystal panel 6 serving as a light valve. The polarizing unit 27, as shown in FIGS. 13 and 14, is provided with a reflecting device 19 which has a circular opening portion 19a in its central portion with the object on a side of an illuminated subject face 7 being polished to a mirror smooth state, a circularly cylindrical rod integrator 22 made of glass or a plastic, a quarter-wave plate 21, a reflecting device with a rectangular opening 23 having a rectangular opening portion 23a at its central portion with a side of a light source being polished to a mirror smooth state, and a polarized light separating unit 24 and these components are arranged in this order. Here, the reflecting device 19 with a circular opening and the quarter-wave plate 21 make up a polarized light converting unit.

Next, functions of the polarizing illumination device 26 of the embodiment are described by referring to FIG. 13. Randomly polarized light Lr fed from the light source lamp 2, as shown in FIG. 13, is gathered by the reflecting mirror 3 and then transmits through the circular opening portion 19a of the reflecting device 19 and, after having entered a light incident end face SI of the circularly cylindrical rod integrator 22, reaches a light outgoing end face SO while repeating reflection by a surrounding side face SW and is emitted therefrom. Thereafter, the randomly polarized light Lr, after having transmitted through the quarter-wave plate 21 being placed on a side of the illuminated subject face 7 of a light outgoing end face SO of the circularly cylindrical rod integrator 22 and, after having reached the rectangular opening portion 23a of the reflecting device with a rectangular opening 23, transmits through the rectangular opening portion 23a and reaches the polarized light separating unit 24. A p-polarized light Lp out of linearly polarized light components contained in the randomly polarized light Lr being incident on the polarized light separating unit 24, after having transmitted through the polarized light separating unit 24, reaches the illuminated subject face 7 of the liquid crystal panel 6 by its transmission through the condenser lens 5 and forms an image of the light outgoing end face SO of the circularly cylindrical rod integrator 22 on the illuminated subject face 7.

An s-polarized light Ls reflected off the polarized light separating unit 24, after having reached the quarter-wave plate 21 being placed between the polarized light separating unit 24 and the light outgoing end face SO of the circularly cylindrical rod integrator 22, is converted into a circularly polarized light Lc and then enters the light outgoing end face SO of the circularly cylindrical rod integrator 22, travels backward to a side of the light source lamp 2 from the light outgoing end face SO, transmits within the circularly cylindrical rod integrator 22 while repeating side face reflection, then returns back to the incident light end face SI, and is emitted therefrom. The circularly polarized light Lc, after having transmitted through the circular opening portion 19a of the reflecting device 19, is reflected off the reflecting mirror 3 and returns back to a place being near to a light emitting portion of the light source lamp 2 and finally is used as light from the light source for a newly circularly polarized light Lc.

The circularly polarized light Lc is gathered by the reflecting mirror 3 and, after having transmitted through the circular opening portion 19a of the reflecting device 19, enters the incident light end face SI of the circularly cylindrical rod integrator 22, transmits within the circularly cylindrical rod integrator 22 and is emitted from the light outgoing end face SO and, when having passed through the quarter-wave plate 21, is converted into the p-polarized light Lp and, after having transmitted through the rectangular opening portion 23a of the reflecting device with a rectangular opening 23, transmits through the polarized light separating unit 24 to illuminate the liquid crystal panel 6. Moreover, the circularly polarized light Lc not transmitting through the circular opening portion 19a of the reflecting device 19 but being reflected off the circular opening portion 19a of the reflecting device 19 transmits within the circularly cylindrical rod integrator 22 and reaches the light outgoing end face SO and is converted into the p-polarized light Lp in the quarter-wave plate 21. The p-polarized light Lp, after having reached the reflecting device with a rectangular opening 23 and having transmitted through the rectangular opening portion 23a, transmits through the polarized light separating unit 24 and contributes to illumination on the illuminated subject face 7 of the liquid crystal panel 6 by its transmission through the condenser lens 5. Thus, illumination luminous flux having unified polarizing directions can be obtained.

According to the fourth embodiment, almost same effects as obtained in the third embodiment can be obtained. That is, as in the case of the third embodiment, randomly polarized light of the light source lamp 2 can be converted into p-polarized light Lp with high efficiency and, since the p-polarized light Lp can be utilized, efficiency of using the light source can be improved.

Fifth Embodiment

Figure 15:
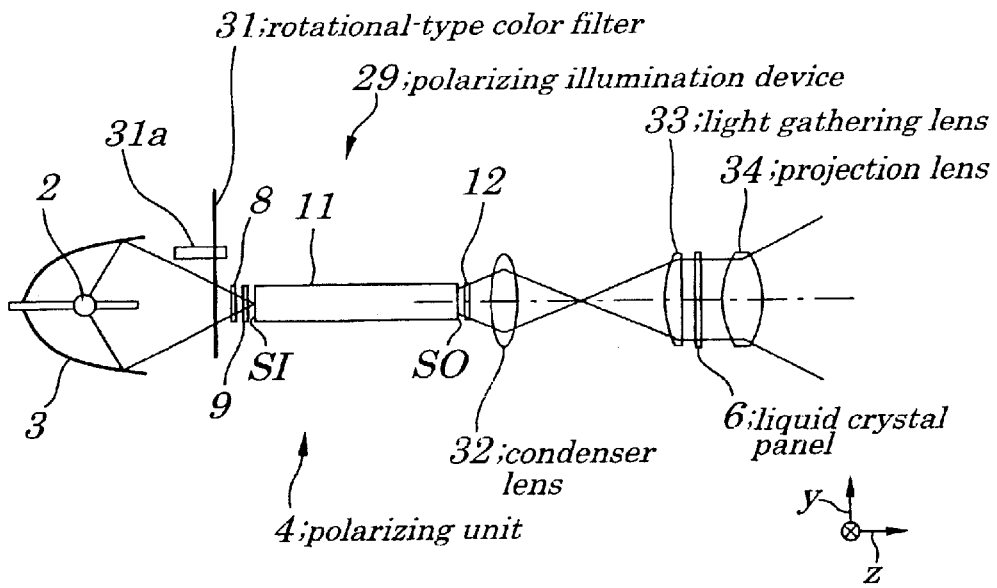
FIG. 15 is a cross-sectional view illustrating configurations of a projection display device according to a fifth embodiment of the present invention.

FIG. 15 is a cross-sectional view illustrating configurations of a projection display device 28 according to a fifth embodiment of the present invention. In the projection display device 28 of the fifth embodiment of the present invention, for example, the polarizing illumination device of the first embodiment is employed. The projection display device 28 is a single projection display device which has a polarizing illumination device 29, a rotational-type color filter 31 serving as a time-sharing color separating unit being placed on a side of the light source of the polarizing illumination device 29, condenser lenses 32 and 33, liquid crystal panel 6, and projection lens 34.

In the embodiment, the rotational-type color filter 31 is made up of a device such as a dichroic mirror in which three colors ordinarily including red, blue, and green colors, or magenta, cyan, and yellow colors are selectively provided so that light being incident from a light source lamp 2 is selectively transmitted depending on a wavelength and a driving section 31a to start rotation of the dichroic mirror. Moreover, the rotational-type color filter 31 is a circularly wheel-shaped filter in which the dichroic mirror is almost equally placed on the wheel. Moreover, it is preferable that a ratio of distribution of the dichroic mirror is such that consideration is given to a light emitting characteristic possessed by the light source lamp 2 and so that an energy ratio of each of the red, blue, and green colors is corresponded to.

In the fifth embodiment, two condenser lenses 32 and 33 are used in order to form an image showing information about illumination on a light outgoing end face SO of a rod integrator (columnar integrated device) 11 on the liquid crystal panel 6 serving as a light valve. Thus, by additionally placing the condenser lens 33 immediately before an illuminated subject face 7, parallelism in incident light can be further improved.

The liquid crystal panel 6 serving as the light valve can be configured that a TN-type liquid crystal is sealed between two transparent glass substrates and a TFT is also formed as a switching element.

Moreover, as a liquid crystal, besides the TN-type liquid crystal, a ferroelectric-type or an antiferroelectric-type, a horizontally-oriented type or a vertically-oriented type, and a high molecular-diverging type liquid crystal can be used. At back and rear sides of two glass substrates with the liquid crystal being sealed is placed a polarizing plate (not shown). It is expected that, in addition to a transmission-type active matrix TFT liquid crystal panel, a reflection-type Lcos or a like may be used.

Light used to illuminate the liquid crystal panel 6 is electrooptically modified by the liquid crystal panel 6 depending on an image signal and an image appeared on the liquid crystal panel 6 is projected through the projection lens 34 in an enlarged manner on a screen (not shown). The projection display device 28 of the embodiment employs a method of performing projection on a screen not only from a rear face but also from a front face.

According to the fifth embodiment, non-polarized light fed from the light source lamp 2 is effectively polarized and converted and illuminating light having high uniformity and comparatively better parallelism can be used and therefore a projected image can obtain high luminance and high ratio of illumination. In particular, the projection display device 28 of the embodiment can be used suitably for a single projection display device using a small-sized liquid crystal panel in which parallelism of light being incident on the liquid crystal panel 6 is required.

Sixth Embodiment

Figure 16:
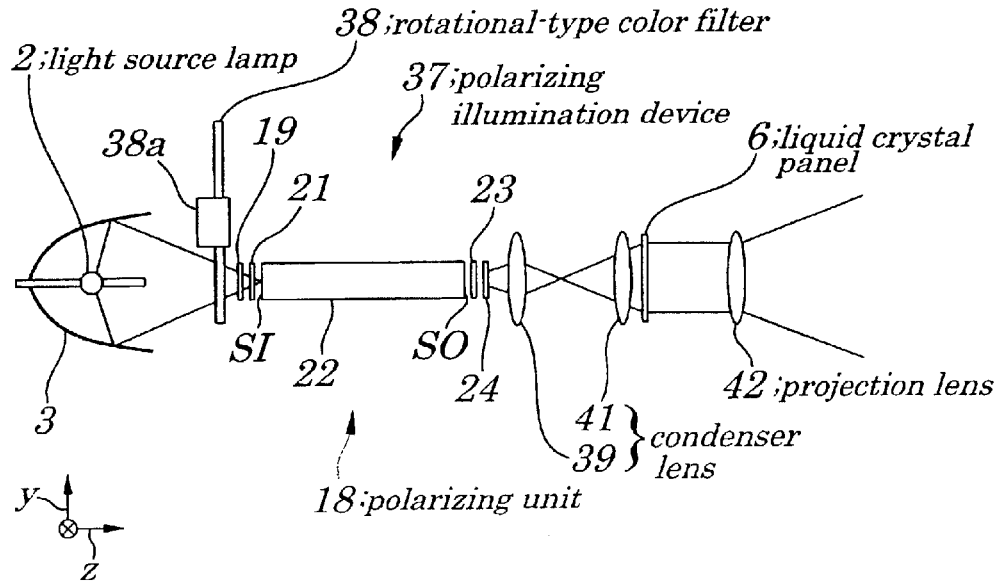
FIG. 16 is a cross-sectional view illustrating configurations of a projection display device according to a sixth embodiment of the present invention.

FIG. 16 is a cross-sectional view illustrating configurations of a projection display device 36 according to a sixth embodiment of the present invention. Configurations of the projection display device 36 of the sixth embodiment differ from those in the fifth embodiment in that, instead of the square pole shaped rod integrator, a circularly cylindrical rod integrator is used. Configurations except those described above are same as those in the fifth embodiment and their descriptions are simplified accordingly. In the projection display device 36 of the sixth embodiment, the polarizing illumination device employed in the third embodiment are used.

The projection display device 36 is a single projection display device which has a polarizing type and illuminating device 37, a rotational color filter 38 serving as a time-sharing color separating unit being placed on a side of the light source of the polarizing illumination device 37, condenser lenses 39 and 41, a liquid crystal panel 6, and a projection lens 42. In the embodiment, the rotational type color filter 38 is made up of a device such as a dichroic mirror in which three colors ordinarily including red, blue, and green colors, or magenta, cyan, and yellow colors are selectively provided so that light being incident from the light source lamp 2 is selectively transmitted depending on a wavelength and a driving section 38a to start rotation of the dichroic mirror. Moreover, the rotational type color filter 38 is a circularly wheel-shaped filter in which the dichroic mirror is almost equally placed on the wheel. Moreover, it is preferable that a ratio of distribution of the dichroic mirror is such that consideration is given to a light emitting characteristic possessed by the light source lamp 2 and such that an energy ratio of each of the red, blue, and green colors is corresponded to.

In the sixth embodiment, two condenser lenses 39 and 41 are used in order to form an image showing information about illumination on a light outgoing end face SO of a rod integrator (columnar integrated device) 22 on the liquid crystal panel 6 serving as a light valve. Thus, by additionally placing the condenser lens 41 immediately before the illuminated subject face 7, parallelism in incident light can be further improved. The liquid crystal panel 6 serving as the light valve can be configured that a TN-type liquid crystal is sealed between two transparent glass substrates and a TFT is also formed as a switching element.

Light used to illuminate the liquid crystal panel 6 is electrooptically modified by the liquid crystal panel 6 depending on an image signal and an image appeared on the liquid crystal panel 6 is projected through a projection lens 42 in an enlarged manner on a screen (not shown). The projection display device 36 of the embodiment employs a method of performing projection on a screen not only from a rear face but also from a front face.

According to the sixth embodiment, almost same effects as obtained in the fifth embodiment can be obtained. Additionally, since the circularly cylindrical rod integrator 22 that can provide easy working is used, when compared with, for example, a case in which the square-pole-shaped rod integrator is used, a polarizing unit 18 and the polarizing illumination device 37 can be fabricated at lower costs. Here, in a reflecting device with a rectangular opening 23, the randomly polarized light Lr having reached not the circular opening portion 23a but the reflecting face repeats side face reflection within the circularly cylindrical rod integrator 22 and is finally converted to a polarized component that can transmit through a polarized light separating unit 24 and is used as illuminating light and therefore even if the reflecting device with a rectangular opening 23 is mounted, it is possible to fabricate an illumination optical system having high efficiency of using the light source.

It is apparent that the present invention is not limited to the above embodiments but may be changed and modified without departing from the scope and spirit of the invention.

For example, in the above embodiments, though the rod integrator made up of a solid square pole or solid cylinder is used, however, by using, besides the rod integrator, a hollow pipe being called a "light pipe" having a shape of a square pole or a cylinder with an outside frame being fabricated by a reflecting surface such as glass or a like, same effects can be obtained. In this case, the light pipe may be fabricated by combining optical devices being groove-shaped in a cross section and being split into two sections up and down.

Moreover, in the fifth and sixth embodiments, the single plate-type display device is provided, however, three plate-type display device using three crystal panels may be employed. Both transmission-type liquid panel and reflection-type liquid crystal such as an LCOS-type liquid crystal can be used. Moreover, the projection display device may be configured by using for example, a DMD (Digital Mirror Device) manufactured by Texas Instrument Co., instead of a liquid crystal panel. In the fifth embodiment, the polarizing illumination-device used in the first embodiment are used, however, the polarizing illumination device used in the second embodiment may be used. Moreover, in the sixth embodiment, the polarizing illumination device used in the third embodiment is used, however, the polarizing illumination device used in the fourth embodiment may be used. It is not always necessary that a size of the light incident end face and a size of the light outgoing end face of the rod integrator are same and any size may be acceptable so long as it is similar having same central axis. That is, the rod integrator may be fabricated so as to form a part of a pyramid or a cone being tapered in a cross section toward a side of the light outgoing end face.

As described above, according to configurations of a polarized light unit of the present invention, a device used to achieve uniformity of illumination and a device used to convert polarized light can be arranged in a proximity to each other or can be integrated, with uniformity of illumination, polarized light converting rate, and parallelism of incident light being kept high and therefore the polarized light unit can be configured so as to be small and lightweight. According to the polarizing illumination device, use of the polarizing unit of the present invention makes the polarizing illumination device be small and lightweight. Also, according to the projection display device, use of the polarizing illumination device makes the projection display device be small. Also, by using the circularly cylindrical columnar integrated unit, the polarizing unit, polarizing illumination device and the projection display device can be fabricated at lower costs when compared with a case in which the square pole shaped columnar integrated device is used. By placing the reflecting unit with an opening which has a rectangular opening portion in the vicinity of the light outgoing end face of the columnar integrated device, the liquid crystal panel serving as an illuminated subject face can be illuminated so as to make a shape of an area being illuminated rectangular and reduction of illuminating efficiency and of efficiency of using the light source can be avoided.

What is claimed is:
1. A polarizing unit for receiving light fed from a light source and for emitting polarized illuminating light to an subject to be illuminated, said polarizing unit comprising:
a polarized light converter used to obtain a specified type of polarized light and, when polarized light is incident from a side of said subject to be illuminated, to convert a phase difference between two light components whose polarized directions orthogonal to each other and to emit said polarized light to a side of said subject to be illuminated;

a light guiding member having a light incident end face formed on a side of said light source and a light outgoing end face formed on a side of said subject to be illuminated and used to have incident light travel in a straight line or have internal reflection occur to guide said light;

a polarized light separator to separate a specified type of polarized light from an other specified type of polarized light and to transmit the separated polarized light; and wherein said polarized light converter and said light guiding member are placed on a side of said light source in said polarized light separator.

2. The polarizing unit according to claim 1, wherein said polarized light converter has a reflector with an opening which receives light emitted from said light source through an opening portion and reflects light being incident from a side of said subject to be illuminated and a phase delaying device being placed on a side of said subject to be illuminated of said reflector with said opening and wherein said reflector with said opening, said phase delaying device, said light guiding member are placed on a side of said light source of said polarized light separator.

3. The polarizing unit according to claim 2, wherein said phase delaying device is placed between said reflector with said opening and said light guiding member.

4. The polarizing unit according to claim 2, wherein said phase delaying device is placed between said light guiding member and said polarized light separator.

5. The polarizing unit according to claim 1, wherein said light guiding member is made up of a solid or hollow columnar integrated device.

6. The polarizing unit according to claim 2, wherein said reflector with said opening has said opening portion being placed in its almost central portion and said opening portion allows light to be transmitted and other portions except said opening portion reflect light.

7. The polarizing unit according to claim 2, wherein said phase delaying device is a quarter-wave plate.

8. The polarizing unit according to claim 5, wherein said columnar integrated device is made of glass or plastic and wherein said light incident end face and said light outgoing end face are of a rectangular square pole shape and wherein said columnar integrated device totally reflects light being incident on said light incident end face on a side face and to guide said light toward said light outgoing end face.

9. The polarizing unit according to claim 5, wherein said columnar integrated device is made of glass or plastic and wherein said light incident end face and said light outgoing end face are of a circular cylindrical shape and wherein said columnar integrated device totally reflects light being incident on said light incident end face on a side face and to guide said light toward said light outgoing end face.

10. The polarizing unit according to claim 9, wherein, on a side of said light outgoing end face of said columnar integrated device is placed a rectangular opening portion and a reflecting device with an opening using a surface on a side of said light source as a reflecting surface.

11. The polarizing unit according to claim 10, wherein a size of said polarized light separator is set to be larger than that of said rectangular opening portion.

12. The polarizing unit according to claim 1, wherein said polarized light separator transmits only one component out of two linearly polarized components orthogonal to each other contained in randomly polarized light being incident and reflects another component out of said two linearly polarized components.

13. The polarizing unit according to claim 3, wherein said reflector with said opening and said phase delaying device are configured so as to come into contact with said light incident end face of said light guiding member.

14. The polarizing unit according to claim 4, wherein said reflector with said opening is configured so as to come into contact with said light guiding member and said phase delaying device is configured so as to come into contact with said light outgoing end face.

15. The polarizing unit according to claim 14, wherein said reflector with said opening is formed by vacuum evaporation on said light incident end face of said light guiding member.

16. A polarizing unit for receiving light fed from a light source and for emitting polarized illuminating light to an subject to be illuminated, said polarizing unit comprising:

a polarized light converting means used to obtain a specified type of polarized light and, when polarized light is incident from a side of said subject to be illuminated, to convert a phase difference between two light components whose polarized directions orthogonal to each other and to emit said polarized light to a side of said subject to be illuminated;

a light guiding means having a light incident end face formed on a side of said light source and a light outgoing end face formed on a side of said subject to be illuminated and used to have incident light travel in a straight line or have internal reflection occur to guide said light;

a polarized light separating means to separate a specified type of polarized light from an other specified type of polarized light and to transmit the separated polarized light; and wherein said polarized light converting means and said light guiding means are placed on a side of said light source in said polarized light separating means.

17. The polarizing unit according to claim 16, wherein said polarized light converting means has a reflecting means with an opening which receives light emitted from said light source through an opening portion and reflects light being incident from a side of said subject to be illuminated and a phase delaying means being placed on a side of said subject to be illuminated of said reflecting means with said opening and wherein said reflecting means with said opening, said phase delaying means, said light guiding means are placed on a side of said light source of said polarized light separating means.

18. A polarizing illumination device for achieving uniformity of illumination and polarized light conversion, comprising:

a light source;

a light condensing device to condense light fed from said light source;

a polarizing unit comprising a polarized light converter used to obtain a specified type of polarized light and, when polarized light is incident from a side of said subject to be illuminated, to convert a phase difference between two light components whose polarized directions orthogonal to each other and to emit said polarized light to a side of said subject to be illuminated; a light guiding member having a light incident end face formed on a side of said light source and a light outgoing end face formed on a side of said subject to be illuminated and used to have incident light travel in a straight line or have internal reflection occur to guide said light; a polarized light separator to separate a specified type of polarized light from an other specified type of polarized light and to transmit the separated polarized light; and wherein said polarized light converter and said light guiding member are placed on a side of said light source in said polarized light separator; and a condenser lens to gather light having passed through said polarized light separator on said subject to be illuminated.

19. A projection display device comprising:

a polarizing illumination device for achieving uniformity of illumination and polarized light conversion, comprising: a light source; a light condensing device to condense light fed from said light source; a polarizing unit comprising a polarized light converter used to obtain a specified type of polarized light and, when polarized light is incident from a side of said subject to be illuminated, to convert a phase difference between two light components whose polarized directions orthogonal to each other and to emit said polarized light to a side of said subject to be illuminated; a light guiding member having a light incident end face formed on a side of said light source and a light outgoing end face formed on a side of said subject to be illuminated and used to have incident light travel in a straight line or have internal reflection occur to guide said light; a polarized light separator to separate a specified type of polarized light from an other specified type of polarized light and to transmit the separated polarized light; and wherein said polarized light converter and said light guiding member are placed on a side of said light source-in-said polarized light separator; and a condenser lens to gather light having passed through said polarized light separator on said subject to be illuminated;

a color separator to separate light emitted from said polarizing illumination device into a plurality of primary colors of light;

a light valve serving as the subject to be illuminated to electrooptically modulate light fed from said color separator; and a projection lens to project light of picture image modulated by said light valve in an enlarged manner.

\* \* \* \* \*